(12) United States Patent
Barak et al.

(10) Patent No.: US 10,324,815 B2
(45) Date of Patent: Jun. 18, 2019

(54) ERROR CHECKING OF A MULTI-THREADED COMPUTER PROCESSOR DESIGN UNDER TEST

(71) Applicant: INTERNATIONAL BUSINESS MACHINES CORPORATION, Armonk, NY (US)

(72) Inventors: Erez Barak, Kfar Saba (IL); Oz D. Hershkovitz, Haifa (IL); Gilad Merran, Petach Tikva (IL); Eyal Naor, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 15/432,584

(22) Filed: Feb. 14, 2017

(65) Prior Publication Data

US 2018/0232292 A1 Aug. 16, 2018

(51) Int. Cl.
*G06F 11/00* (2006.01)
*G06F 11/26* (2006.01)
(Continued)

(52) U.S. Cl.
CPC .......... *G06F 11/26* (2013.01); *G06F 11/2236* (2013.01); *G06F 17/5022* (2013.01); *G06F 2217/68* (2013.01)

(58) Field of Classification Search
CPC .... G06F 11/26; G06F 11/2236; G06F 11/263; G06F 17/5009; G06F 17/5022; G06F 2217/68
See application file for complete search history.

(56) References Cited

U.S. PATENT DOCUMENTS 5,845,064 A * 12/1998 Huggins ............... G06F 11/261
714/33
7,779,393 B1 8/2010 Manovit et al.
(Continued)

OTHER PUBLICATIONS

Rodrigues, Rance et al., "A Mechanism to Verify Cache Coherence Transactions in Multicore Systems", 2012 IEEE International Symposium on Defect and Fault Tolerance in VLSI and Nanotechnology Systems (DFT), Oct. 2012, pp. 211-216.
(Continued)

*Primary Examiner* — Joseph D Manoskey
(74) *Attorney, Agent, or Firm* — William Kinnaman, Jr., Esq.; Kevin P. Radigan, Esq.; Heslin Rothenberg Farley & Mesiti P.C.

(57) ABSTRACT

Error checking for a computer processor design under test. In multiple processing threads, and in accordance with a hardware model of a computer processor design under test, the instructions of multiple instruction sequences corresponding to the processing threads are processed, thereby resulting in an order in which the instructions are processed in accordance with the hardware model, and producing an actual result for each of the instructions. An expected result is determined for any of the instructions in accordance with a reference model of the computer processor design under test and in accordance with the order in which the instructions were processed in accordance with the hardware model. Any of the instructions whose expected result and actual result differ are identified.

20 Claims, 4 Drawing Sheets

(51) Int. Cl.
*G06F 11/22* (2006.01)
*G06F 17/50* (2006.01)

(56) References Cited

U.S. PATENT DOCUMENTS

| | | | |
|---|---|---|---|
| 8,521,963 B1 | 8/2013 | Miao et al. | |
| 9,264,380 B2 | 2/2016 | Hass | |
| 2008/0115027 A1* | 5/2008 | Geller | G06F 11/263 |
| | | | 714/738 |
| 2011/0055780 A1* | 3/2011 | Venell | G01R 31/318364 |
| | | | 716/106 |
| 2013/0191689 A1* | 7/2013 | Almog | G06F 11/2236 |
| | | | 714/35 |
| 2013/0254488 A1 | 9/2013 | Kaxiras et al. | |
| 2015/0100833 A1* | 4/2015 | Jeong | G06F 11/2236 |
| | | | 714/40 |
| 2015/0301108 A1* | 10/2015 | Hamid | G01R 31/3177 |
| | | | 714/724 |

OTHER PUBLICATIONS

Wagner, Ilya, "Runtime Verification in Multi-Cores," Chapter Post-Silicon and Runtime Verification for Modern Processors, Nov. 2010, pp. 189-206.

* cited by examiner

Fig. 4

ERROR CHECKING OF A MULTI-THREADED COMPUTER PROCESSOR DESIGN UNDER TEST

BACKGROUND

Multi-threaded core processors are dominant in most modern computer processor designs. One of the most useful techniques for testing computer processor designs involves generating an instruction sequence and expected results using a reference model of the computer processor design. The same instructions are then processed in a simulation using a hardware model of the computer processor design, where the actual results of the hardware simulation are compared with the expected results generated using the reference model. A mismatch for any instruction would indicate an error in the reference model, the hardware model, or both.

Testing multi-threaded core processor designs often involves testing instructions in different threads that access shared computer memory locations. The order in which such instructions are processed determines the state of computer memory locations and processor registers at any given point during instruction processing. Unfortunately, as the order in which the instructions of different threads in multi-threaded software applications is unknown before processing the instructions using a hardware model of a computer processor design under test, generating expected results for the instructions using a reference model in advance of hardware model simulation is challenging.

SUMMARY

Shortcomings of the prior art are overcome and additional advantages are provided through the provision of a computer-implemented method of error checking of a computer processor design under test. The method includes, for instance, processing, in a plurality of processing threads, and in accordance with a hardware model of a computer processor design under test, instructions of a plurality of instruction sequences corresponding to the processing threads, resulting in an order in which the instructions are processed in accordance with the hardware model, and producing an actual result for each of the instructions; determining an expected result for one or more of the instructions in accordance with a reference model of the computer processor design under test and in accordance with the order in which the instructions were processed in accordance with the hardware model; and identifying one or more of the instructions whose expected result and actual result differ.

Systems and computer program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
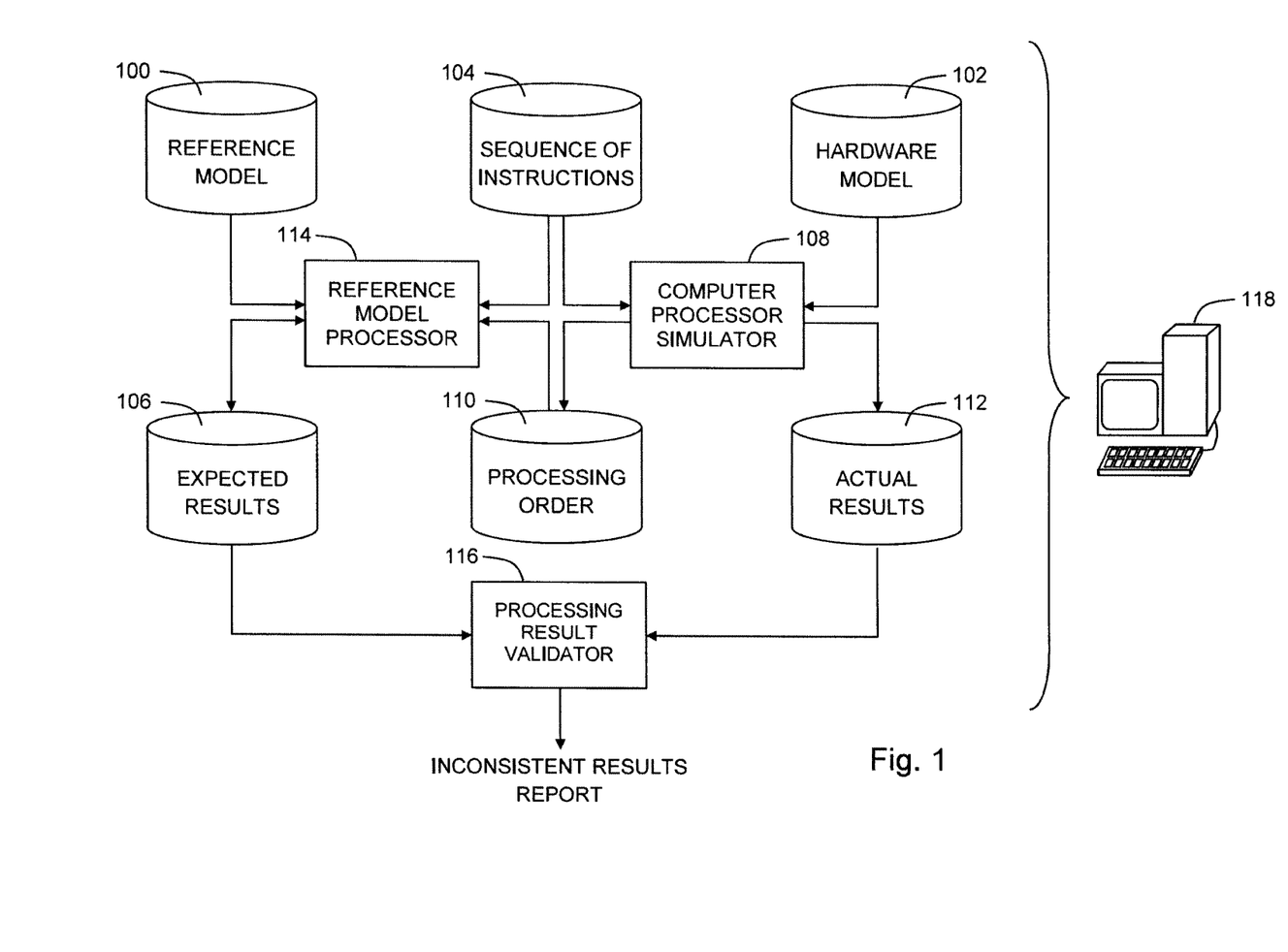
FIG. 1 is a conceptual illustration of a system for performing error checking of a computer processor design under test, constructed and operative in accordance with an embodiment of the invention.

Reference is now made to FIG. 1, which is a conceptual illustration of a system for performing error checking of a computer processor design under test, constructed and operative in accordance with an embodiment of the invention. In the system of FIG. 1, a computer processor design under test is modeled, in accordance with one or more conventional techniques, as a reference model 100 and as a hardware model 102, where the computer processor design under test is configured for processing multiple processing threads. Two or more sequences of instructions 104 are provided for evaluation with respect to the computer processor design under test, where each sequence of instructions 104 corresponds to a different processing thread and includes one or more computer software instructions adapted for execution by the computer processor design under test. Any of the instructions in any of the sequences of instructions 104 may refer to computer memory locations that the computer processor design under test is configured to read from and/or write to, where any computer memory location may be referred to by instructions in one or more of the sequences of instructions 104, and thus by one or more corresponding processing threads. A computer memory location that is referred to by instructions in two or more of the sequences of instructions 104, and thus by two or more corresponding processing threads, is referred to herein as a "shared" computer memory location, whereas a computer memory location that is referred to by instructions in only one of the sequences of instructions 104, and thus by only one corresponding processing thread, is referred to herein as a "non-shared" computer memory location.

In one embodiment, reference model 100 is used in accordance with one or more techniques to determine an expected result 106 for any of the instructions in any of the sequences of instructions 104, typically in advance of evaluating any of the instructions in accordance with hardware model 102 as described herein below. Where instructions in two or more of the sequences of instructions 104 refer to the same computer memory location, i.e., to a "shared" computer memory location, expected results 106 for such instructions need not be determined in this manner, or may be determined in this manner and then may be discarded or disregarded, and the expected results 106 for such instructions may be marked, in accordance with one or more techniques, as having undetermined values.

A computer processor simulator 108 is configured, in accordance with one or more conventional techniques, to process the sequences of instructions 104 in their corresponding processing threads in accordance with hardware model 102, and record both a processing order 110 in which the instructions of the sequences of instructions 104 are processed, as well as actual results 112 for each of the instructions.

A reference model processor 114 is configured to determine expected results 106 for any of the instructions in the sequences of instructions 104 in accordance with reference model 100. In one embodiment, reference model processor 114 is configured to determine expected results 106 in this manner by evaluating the instructions in the order in which the instructions were processed in accordance with hardware model 102, as indicated by processing order 110. In an additional embodiment, where expected results 106 were previously determined as described hereinabove for instructions that refer to "non-shared" computer memory locations, reference model processor 114 is configured to determine expected results 106 in this manner for instructions that refer to "shared" computer memory locations. In an additional or alternative embodiment, reference model processor 114 is configured to determine expected results 106 for any of the instructions in the sequences of instructions 104 in accordance with reference model 100 prior to computer processor simulator 108 processing the instructions as described hereinabove.

A processing result validator 116 is configured to identify any of the instructions whose expected result 106 and actual result 112 differ, which may be related to an error, such as a design flaw, in the computer processor design under test, in reference model 100, or in hardware model 102. Processing result validator 116 is, in one embodiment, configured to report, in accordance with one or more techniques, on any instructions regarding which such inconsistent results are identified.

Any of the elements shown in FIG. 1 may be implemented by one or more computers in computer hardware and/or in computer software embodied in a non-transitory, computer-readable medium in accordance with one or more techniques, such as where any of the elements shown in FIG. 1 are hosted by a computer 118.

Figure 2:
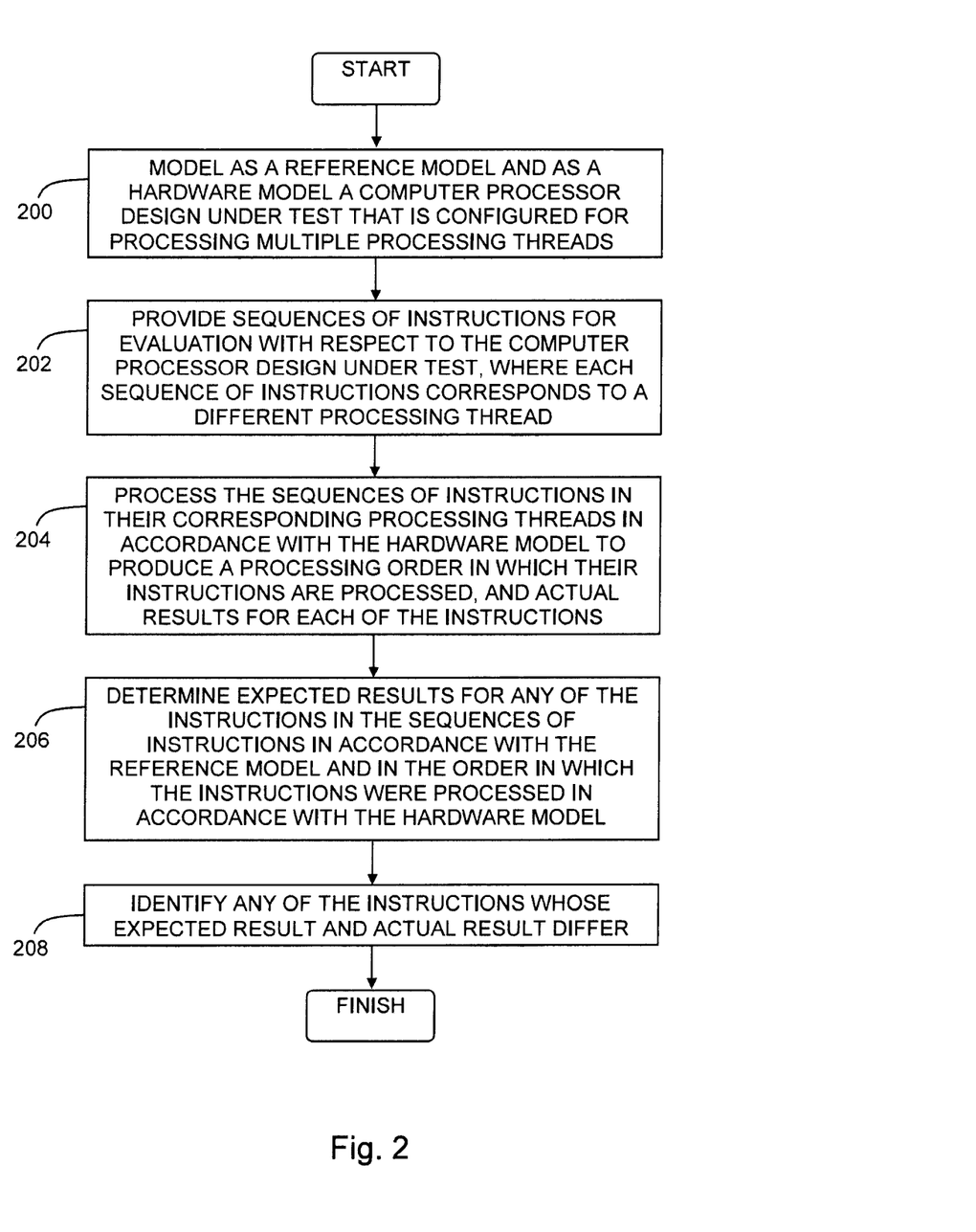
FIG. 2 is a flowchart illustration of an example method of operation of the system of FIG. 1, operative in accordance with an embodiment of the invention.

Reference is now made to FIG. 2, which is a flowchart illustration of an example method of operation of the system of FIG. 1, operative in accordance with an embodiment of the invention. In the method of FIG. 2, a computer processor design under test that is configured for processing multiple processing threads is modeled as a reference model and as a hardware model (step 200). Two or more sequences of instructions are provided for evaluation with respect to the computer processor design under test, where each sequence of instructions corresponds to a different processing thread and includes one or more computer software instructions adapted for execution by the computer processor design under test (step 202). The sequences of instructions are processed in their corresponding processing threads in accordance with the hardware model to produce a processing order in which their instructions are processed, as well as actual results for each of the instructions (step 204). Expected results are determined for any of the instructions in the sequences of instructions in accordance with the reference model and in the order in which the instructions were processed in accordance with the hardware model (step 206). Any of the instructions whose expected result and actual result differ are identified (step 208).

The system of FIG. 1 and the method of FIG. 2 may be demonstrated in the context of the following example scenario in which two processing threads, Thread 0 and Thread 1, have the following sequences of instructions:

Thread 0:
Store Mem[X]←R0
Add R1←R1,R1
Load R2←Mem[X]
Thread 1:
R3←Load Mem[Y]
Store Mem[X]←R4
Load R5←Mem[X]

where 'Mem[m]' denotes a computer memory location at address 'm' and Rn denotes a processor register n.

In this example, Thread 0 and Thread 1 share a computer memory location, Mem[X], as both Thread 0 and Thread 1 include instructions that refer to Mem[X].

Figure 3:
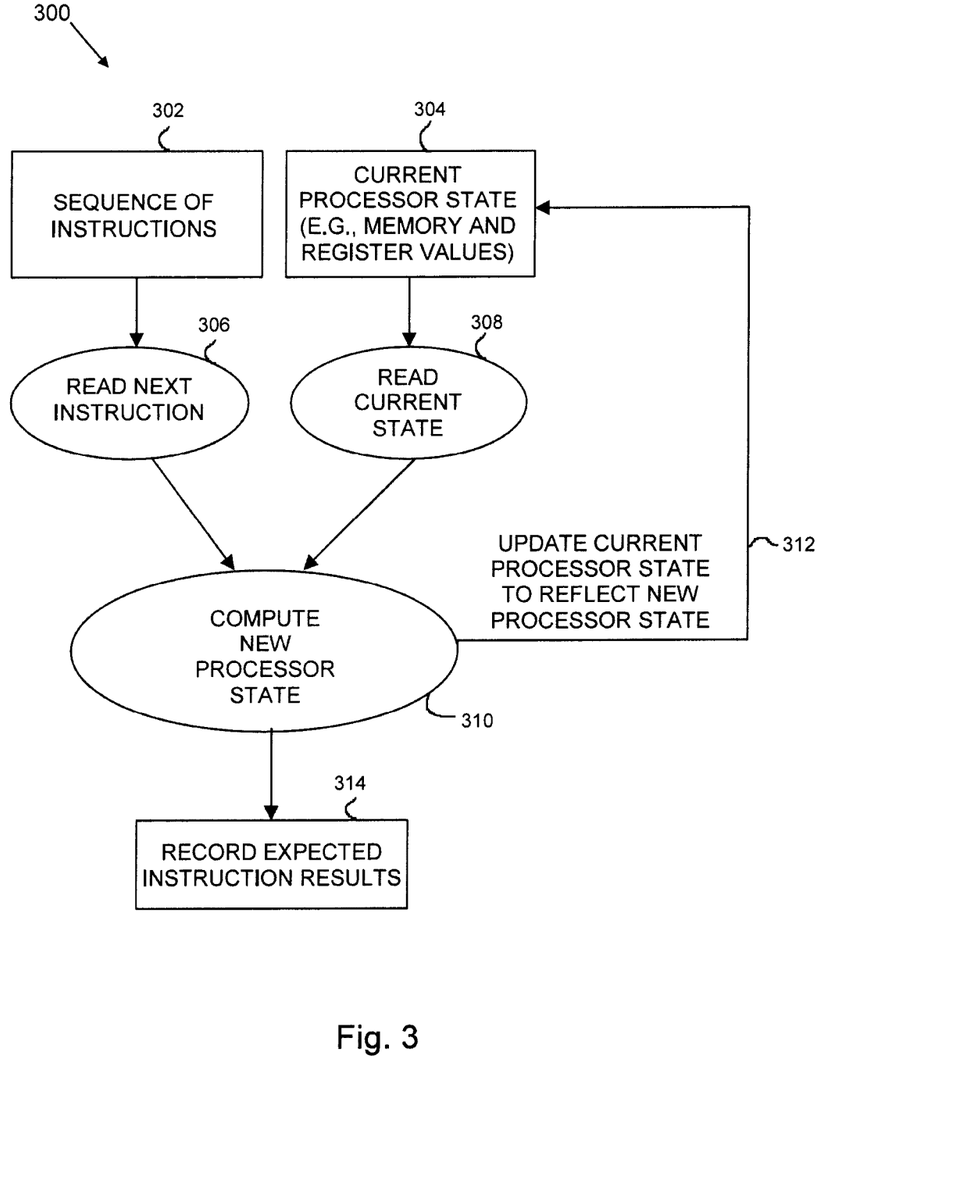
FIG. 3 is a flowchart illustration of an example generic, iterative pre-simulation reference model, operative in accordance with an embodiment of the invention.

Given the following initial processor register values [R0=0, R1=10, R2=5, R3=20, R4=100, R5=1,000], and computer memory location values {Mem[X]=300, Mem[Y]=700}, a generic, iterative pre-simulation reference model, such as model 300 shown in FIG. 3, is applied to the sequences of instructions, first of Thread 0 and then of Thread 1. Model 300 includes a sequence of instructions 302 and current processor state 304, including, for instance, memory and register values. A next instruction of the sequence of instructions 302 is read (306), as well as a current state (308) of the current processor state 304. A new processor state, based on the next instruction read and the current state, is computed (310). The current processor state is updated (312) to reflect the new processor state. Additionally, expected instruction results are recorded (314).

The model is applied to the sequences of instructions to produce the following expected results:

| Instruction | Thread ID | Resources | Expected Result | Actual Result | Processing Order |
|---|---|---|---|---|---|
| Store | 0 | R0(=0), Mem[X] | ? | | |
| Add | 0 | R1(=10) | R1 = 20 | | |
| Load | 0 | R2, Mem[X] | ? | | |
| Load | 1 | R3(=20), Mem[Y] | R3 = 700 | | |
| Store | 1 | R4(=100), Mem[X] | ? | | |
| Load | 1 | R5(=1,000), Mem[X] | ? | | |

The expected results for the instructions that refer to shared computer memory location Mem[X] are marked in Table 1 above as '?' to indicate an undetermined value.

The sequences of instructions are then processed in accordance with the hardware model to obtain actual results for each instruction, as well as the order in which the instructions are processed, to produce the following:

| Instruction | Thread ID | Resources | Expected Result | Actual Result | Processing Order |
|---|---|---|---|---|---|
| Store | 0 | R0(=0), Mem[X] | ? | Mem[X] = 0 | 1 |
| Add | 0 | R1(=10) | R1 = 20 | R1 = 20 | 4 |
| Load | 0 | R2, Mem[X] | ? | R2 = 0 | 5 |
| Load | 1 | R3(=20), Mem[Y] | R3 = 700 | R3 = 700 | 2 |
| Store | 1 | R4(=100), Mem[X] | ? | Mem[X] = 100 | 3 |
| Load | 1 | R5(=1,000), Mem[X] | ? | R5 = 100 | 6 |

Given the actual order in which the instructions were processed, expected results for the instructions that refer to shared computer memory location Mem[X] are determined by applying the reference model to the instructions in the order in which the instructions were processed in accordance with the hardware model, to produce the following:

| Instruction | Thread ID | Resources | Expected Result | Actual Result | Processing Order |
|---|---|---|---|---|---|
| Store | 0 | R0(=0), Mem[X] | Mem[X] = 0 | Mem[X] = 0 | 1 |
| Add | 0 | R1(=10) | R1 = 20 | R1 = 20 | 4 |
| Load | 0 | R2, Mem[X] | R2 = 100 | R2 = 0 | 5 |
| Load | 1 | R3(=20), Mem[Y] | R3 = 700 | R3 = 700 | 2 |
| Store | 1 | R4(=100), Mem[X] | Mem[X] = 100 | Mem[X] = 100 | 3 |
| Load | 1 | R5(=1,000), Mem[X] | R5 = 10 | R5 = 100 | 6 |

By comparing the expected and actual results of the instructions, a coherence violation is identified for the Thread 0 instruction 'Load R2 Mem[X]', which is the fifth instruction processed, as the expected result of this instruction is processor register R2 having a value of 100, whereas the actual result is a value of 0.

Figure 4:
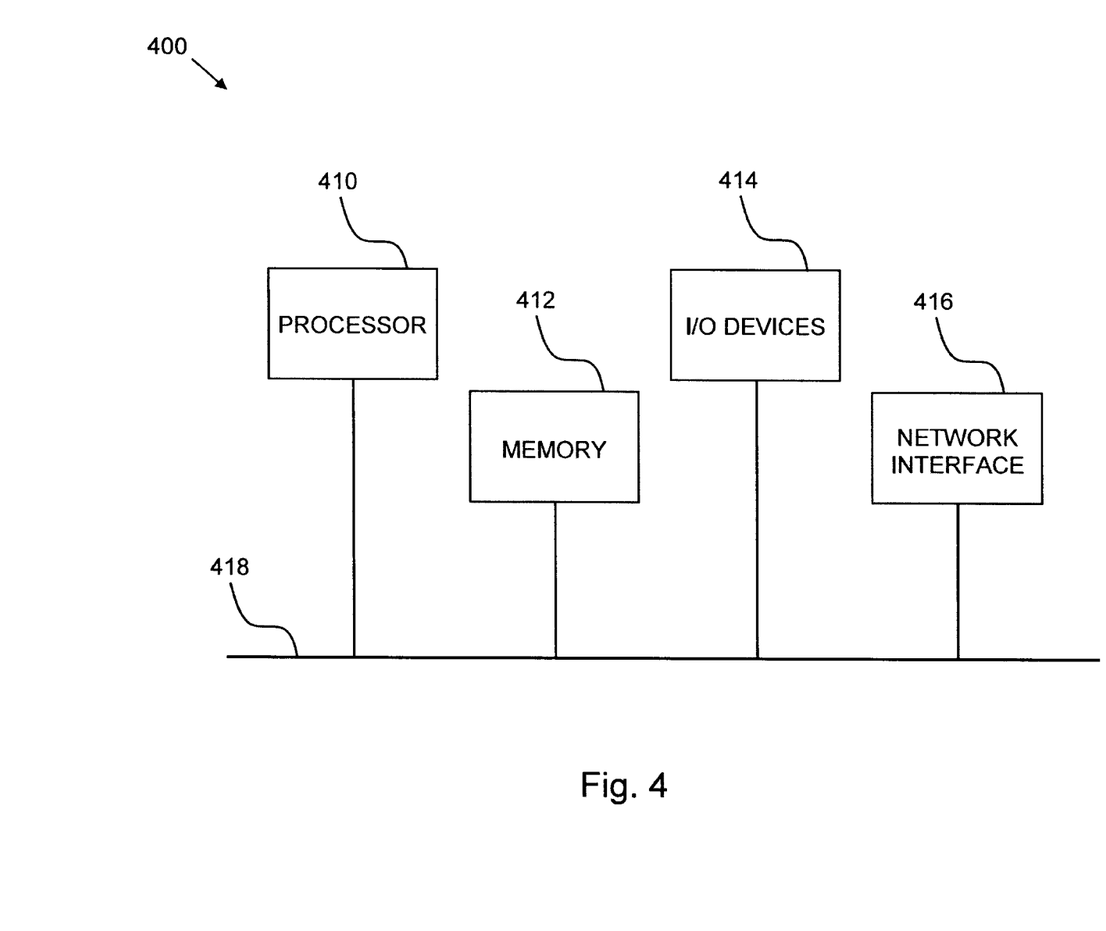
FIG. 4 is a block diagram illustration of an example hardware implementation of a computing system, constructed and operative in accordance with an embodiment of the invention.

Referring now to FIG. 4, a block diagram 400 illustrates an example hardware implementation of a computing system in accordance with which one or more components/methodologies of the invention (e.g., components/methodologies described in the context of FIGS. 1-2) may be implemented, according to an embodiment of the invention. As shown, aspects of the invention may be implemented in accordance with a processor 410, a memory 412, input/output (I/O) devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or a CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

As described herein, in one aspect of the invention, a method is provided for error checking of a computer processor design under test. The method includes processing, in a plurality of processing threads, and in accordance with a hardware model of a computer processor design under test, the instructions of a plurality of instruction sequences corresponding to the processing threads, thereby resulting in an order in which the instructions are processed in accordance with the hardware model, and producing an actual result for each of the instructions. An expected result is determined for any of the instructions in accordance with a reference model of the computer processor design under test and in accordance with the order in which the instructions were processed in accordance with the hardware model, and any of the instructions whose expected result and actual result differ are identified.

In other aspects of the invention, systems and computer program products embodying aspects of the invention are provided.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of error checking of a computer processor design under test, the computer-implemented method comprising:
   processing, in a plurality of processing threads, and in accordance with a hardware model of a computer processor design under test, instructions of a plurality of instruction sequences, each instruction sequence corresponding to a different processing thread of the plurality of processing threads, the processing resulting in an order in which the instructions are processed in accordance with the hardware model, and producing an actual result for each of the instructions;
   recording both the order in which the instructions of the plurality of instruction sequences of the plurality of processing threads are processed in accordance with the hardware model, and the actual result for each of the instructions;
   determining an expected result for one or more of the instructions in accordance with a reference model of the computer processor design under test, the determining using the order in which the instructions were processed in accordance with the hardware model to determine the expected result for the one or more of the instructions in accordance with the reference model of the computer processor design under test; and
   identifying any instruction whose expected result and actual result differ.

2. The computer-implemented method according to claim 1, wherein the determining comprises determining for an instruction that refers to a computer memory location, wherein the computer memory location is referred to by instructions in at least two of the instruction sequences corresponding to at least two of the processing threads.

3. The computer-implemented method according to claim 1, further comprising determining, in accordance with the reference model of the computer processor design under test, an expected result for one or more of the instructions of the plurality of instruction sequences that refer to a computer memory location, wherein the computer memory location is not referred to by an instruction in another instruction sequence of the plurality of instruction sequences.

4. The computer-implemented method according to claim 1, further comprising determining, prior to the processing, and in accordance with the reference model of the computer processor design under test, an expected result for the instructions of the plurality of instruction sequences.

5. The computer-implemented method according to claim 1, further comprising determining, prior to the processing, and in accordance with the reference model of the computer processor design under test, an expected result for one or more of the instructions of the plurality of instruction sequences that refer to a computer memory location, wherein the computer memory location is not referred to by an instruction in another instruction sequence of the plurality of instruction sequences.

6. The computer-implemented method according to claim 1, wherein the determining comprises determining for one or more of the instructions that refer to a computer memory location, wherein the computer memory location is referred to by instructions in at least two instruction sequences of the plurality of instruction sequences, and further comprising determining, prior to the processing, and in accordance with the reference model of the computer processor design under test, an expected result for the instructions of the plurality of instruction sequences that refer to a computer memory location, wherein the computer memory location is not referred to by an instruction in another instruction sequence of the plurality of instruction sequences.

7. The computer-implemented method according to claim 1, wherein the processing, the determining, and the identifying are implemented in computer hardware.

8. A computer system for error checking of a computer processor design under test, the computer system comprising:
   a memory; and
   a processor in communication with the memory, wherein the computer system is configured to perform a method, the method comprising:
      processing, in a plurality of processing threads, and in accordance with a hardware model of a computer processor design under test, instructions of a plurality of instruction sequences, each instruction sequence corresponding to a different processing thread of the plurality of processing threads, the processing resulting in an order in which the instructions are processed in accordance with the hardware model, and producing an actual result for each of the instructions;
      recording both the order in which the instructions of the plurality of instruction sequences of the plurality of processing threads are processed in accordance with the hardware model, and the actual result for each of the instructions;
      determining an expected result for one or more of the instructions in accordance with a reference model of the computer processor design under test, the determining using the order in which the instructions were processed in accordance with the hardware model to determine the expected result for the one or more of the instructions in accordance with the reference model of the computer processor design under test; and
      identifying any instruction whose expected result and actual result differ.

9. The computer system according to claim 8, wherein the determining comprises determining for an instruction that refers to a computer memory location, wherein the computer memory location is referred to by instructions in at least two of the instruction sequences corresponding to at least two of the processing threads.

10. The computer system according to claim 8, wherein the method further comprises determining, in accordance with the reference model of the computer processor design under test, an expected result for one or more of the instructions of the plurality of instruction sequences that refer to a computer memory location, wherein the computer memory location is not referred to by an instruction in another instruction sequence of the plurality of instruction sequences.

11. The computer system according to claim 8, wherein the method further comprises determining, prior to the processing, and in accordance with the reference model of the computer processor design under test, an expected result for the instructions of the plurality of instruction sequences.

12. The computer system according to claim 8, wherein the method further comprises determining, prior to the processing, and in accordance with the reference model of the computer processor design under test, an expected result for one or more of the instructions of the plurality of instruction sequences that refer to a computer memory location, wherein the computer memory location is not referred to by an instruction in another instruction sequence of the plurality of instruction sequences.

13. The computer system according to claim 8, wherein the determining comprises determining for one or more of the instructions that refer to a computer memory location, wherein the computer memory location is referred to by instructions in at least two instruction sequences of the plurality of instruction sequences, and wherein the method further comprises determining, prior to the processing, and in accordance with the reference model of the computer processor design under test, an expected result for the instructions of the plurality of instruction sequences that refer to a computer memory location, wherein the computer memory location is not referred to by an instruction in another instruction sequence of the plurality of instruction sequences.

14. The computer system according to claim 8, wherein the processing, the determining, and the identifying are implemented in computer hardware.

15. A computer program product for error checking of a computer processor design under test, the computer program product comprising:
   a computer readable storage medium readable by a processing circuit and storing instructions for performing a method comprising:
      processing, in a plurality of processing threads, and in accordance with a hardware model of a computer processor design under test, instructions of a plurality of instruction sequences, each instruction sequence corresponding to a different processing thread of the plurality of processing threads, the processing resulting in an order in which the instructions are processed in accordance with the hardware model, and producing an actual result for each of the instructions;
      recording both the order in which the instructions of the plurality of instruction sequences of the plurality of processing threads are processed in accordance with the hardware model, and the actual result for each of the instructions;

determining an expected result for one or more of the instructions in accordance with a reference model of the computer processor design under test, the determining using the order in which the instructions were processed in accordance with the hardware model to determine the expected result for the one or more of the instructions in accordance with the reference model of the computer processor design under test; and identifying any instruction whose expected result and actual result differ.

16. The computer program product according to claim 15, wherein the determining comprises determining for an instruction that refers to a computer memory location, wherein the computer memory location is referred to by instructions in at least two of the instruction sequences corresponding to at least two of the processing threads.

17. The computer program product according to claim 15, wherein the method further comprises determining, in accordance with the reference model of the computer processor design under test, an expected result for one or more of the instructions of the plurality of instruction sequences that refer to a computer memory location, wherein the computer memory location is not referred to by an instruction in another instruction sequence of the plurality of instruction sequences.

18. The computer program product according to claim 15, wherein the method further comprises determining, prior to the processing, and in accordance with the reference model of the computer processor design under test, an expected result for the instructions of the plurality of instruction sequences.

19. The computer program product according to claim 15, wherein the method further comprises determining, prior to the processing, and in accordance with the reference model of the computer processor design under test, an expected result for one or more of the instructions of the plurality of instruction sequences that refer to a computer memory location, wherein the computer memory location is not referred to by an instruction in another instruction sequence of the plurality of instruction sequences.

20. The computer program product according to claim 15, wherein the determining comprises determining for one or more of the instructions that refer to a computer memory location, wherein the computer memory location is referred to by instructions in at least two instruction sequences of the plurality of instruction sequences, and wherein the method further comprises determining, prior to the processing, and in accordance with the reference model of the computer processor design under test, an expected result for the instructions of the plurality of instruction sequences that refer to a computer memory location, wherein the computer memory location is not referred to by an instruction in another instruction sequence of the plurality of instruction sequences.

* * * * *